Feb. 14, 1956     F. H. TOWNSEND ET AL     2,735,035
TELEVISION PICK-UP TUBES AND TRANSMITTING
APPARATUS INCORPORATING THE SAME
Filed June 28, 1954
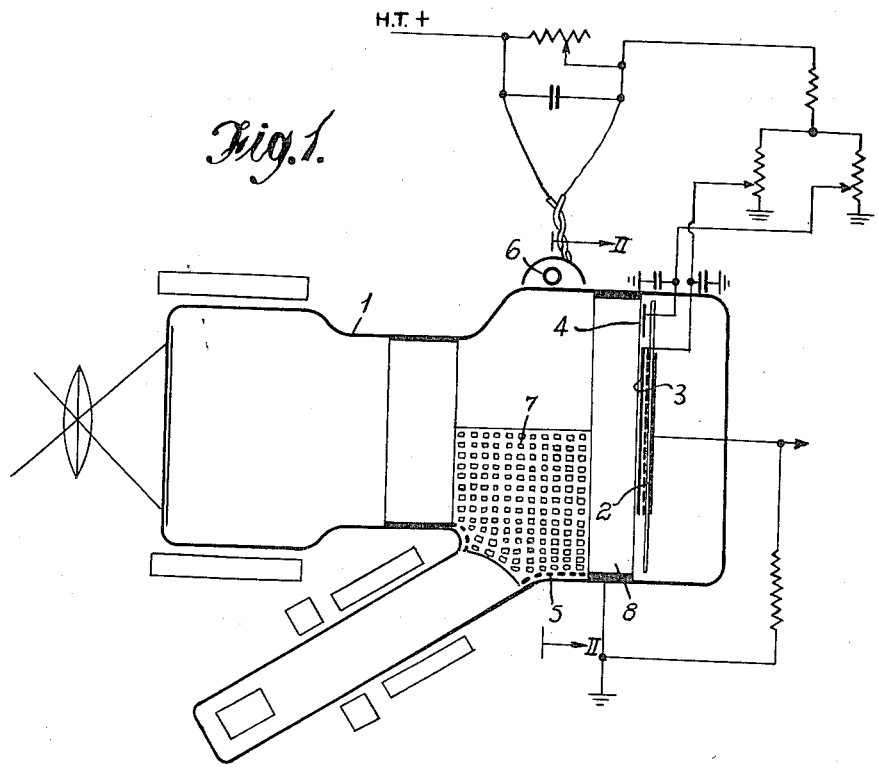
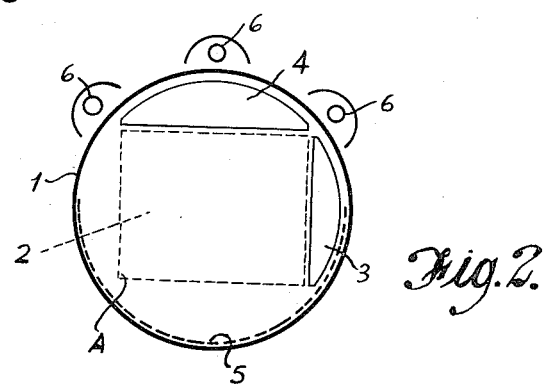
Inventors
FREDERICK H. TOWNSEND &
FREDERICK GEALE
By
Holcombe, Wetherill & Brisebois
Attorneys

United States Patent Office 2,735,035
Patented Feb. 14, 1956

2,735,035

TELEVISION PICK-UP TUBES AND TRANSMITTING APPARATUS INCORPORATING THE SAME

Frederick H. Townsend and Frederick Geale, Cambridge, England, assignors to Cathodeon Limited, Cambridge, England, a British company Application June 28, 1954, Serial No. 439,764

Claims priority, application Great Britain July 8, 1953

7 Claims. (Cl. 315—11)

The present invention relates to television pick-up tubes of the storage type in which the scanning of the storage surface or target is effected by electrons of high velocity, for example of the order of 1,000 volts (tubes of this type include those known as Iconoscopes and Image Iconoscopes) and more particularly to improvements in or modifications of the invention described in the specification of copending application Serial No. 258,459 filed November 27th, 1951, which provides means for reducing or minimising "flare" which occurs in such tubes.

According to a feature of the said prior application, there is provided a pick-up tube of the kind specified in which strip-like electrodes extend along at least some of the edges of, but outside the field of, the picture area on the target, said electrodes being biased to produce an electrostatic field across the target surface, and the tube also includes a source for producing a rain of low-velocity electrons for flooding the entire picture area of the target, two strip-like electrodes located along those edges of the said picture area corresponding respectively to the ends of line and frame scanning being biased positively with respect to the source of low-velocity electrons (and more positively than any strip-like electrodes, if any, arranged along the other edges of the picture area), said strip-like electrodes serving the dual purpose of creating an electrostatic field across the picture area tending to oppose the natural tendency of the secondary electrons released by the scanning beam to migrate mainly towards previously-scanned areas of the target and also of accelerating the low-velocity electrons released from the source towards the target, thereby producing redistribution of the secondary electrons and such distribution of the low-velocity electrons over the picture area that "flare" is substantially eliminated.

More specifically, a tube according to the prior specification utilises a photo-cathode of large-area located on the inside wall of the tube and in front of the charge storage surface as the source of low-velocity electrons.

The biassing lamps for this photo-cathode, usually four in number, were arranged outside the envelope of the tube and so adjusted for brightness and location that in conjunction with adjustment of the biassing potentials applied to the strip electrodes, the optimal distribution of the bias electrons was obtained so as to give as even a black as possible across the picture in the absence of a light image.

It has been found, however, that although this arrangement provided a considerable improvement compared with standard tubes without the biassing arrangements, the evenness of the black level was not entirely satisfactory since there was often a heavy shadow at the top of the picture and dark patches were present which moved with changes in positions of the lamps but which could not be evened out.

Although tests showed that this unevenness could be improved by locating the lamps at some distance from the bulb wall so that the illumination was more diffuse, such arrangements are not practical in television cameras where space is limited. Further investigation showed that the effect of any one lamp was to give rise to a relatively intense emission of electrons from a small area of the photo-cathode immediately adjacent to it and to a less intense emission from a more diffuse area at the opposite side of the bulb due to the light which passed through the first layer of the photo-cathode without being absorbed. On further investigation it was found that it was the small intensely illuminated areas of the photo-cathode (i. e. those areas adjacent the lamps) that were giving rise to the dark patches referred to and the shadow at the top of the picture was due to an excess of electrons since the biasing electrons were adding to redistributed "shading" electrons which are always more numerous in the upper half of the viewed picture.

The present invention has for its object to overcome these drawbacks, and according to one feature of the invention, the dark patches are reduced or avoided by leaving one or more blank spaces in the photo-cathode area, and using the blank space or spaces as a window or windows through which the lamps illuminate the photo-cathode by light passing across the interior of the tube envelope. In this way the lamps although arranged close to the outside of the tube envelope and thus minimising space requirements are arranged more distant from the photo-cathode and the latter is more diffusely illuminated with consequent more diffuse emission of bias electrons.

In a preferred form the photo-cathode extends only approximately half-way around the circumference of the tube envelope and is illuminated by lamps arranged close to that part of the tube envelope which lies diametrically opposite to the photo-cathode.

It has hitherto been thought that the various parts of the target obtained the major part of their biassing electrons from the most adjacent parts of the photo-cathode, but we have now discovered that this is not correct, and it appears from our experiments that the very low-velocity biassing electrons preferentially find their way across the envelope to the opposite side of the target from their source.

According to another feature of the invention, therefore, the top dark shadow is reduced or eliminated by providing the photo-cathode biassing source only at the part of the tube approximately diametrically opposite to that part of the target corresponding to the end of the frame scan (bottom of the picture), the photo-cathode being illuminated by light passing across the interior of the tube from lamps arranged outside the diametrically opposite wall of the tube envelope.

The photo-cathode may be substantially semi-annular and extend around the inside wall of the tube envelope, or on a support spaced therefrom, at the side of the target corresponding to the commencement of frame scanning. Alternatively, the photo-cathode may be arranged diagonally opposite the two edges of the target corresponding to the ends of line and frame scanning. It will be appreciated that the photo-cathode need not extend exactly half-way around the axis of the target. The illuminating lamps are arranged outside the transparent wall of the tube envelope opposite to the semi-annular photo-cathode.

For satisfactory practical results it is sufficient for the strip-like electrodes, biassed to appropriate positive potentials, to be arranged only along and outside the edges of the picture area of the target corresponding to the ends of line and frame scanning.

In accordance with another feature of the invention, at a location in a television pick-up tube at which it is desired to apply the photo-cathode which serves as the source of biassing electrons, the effective resistance of the photo-cathode is reduced by applying on to an area at the said location a low-resistance grid of silver or other good conductor before the photo-cathode is deposited, this grid preventing the build-up of potential gradients across the surface of the photo-cathode due to the passing of the emission current through its high resistance when the tube is in operation.

This grid may be painted, e. g. by hand, on to the area concerned and the lines should be as narrow as it is convenient to apply them, for example, they may be about 2 mm. wide and the mesh pitch may be about 10 mm. The grid may be continuous with the normal wall anode of the tube so that when the photo-cathode has been deposited upon the grid, the photo-cathode is held at the potential of the said anode across its whole area.

In order that the invention may be more clearly understood, an embodiment thereof will now be described with reference to the accompanying drawing, in which:

Fig. 1 is a side view of a pick-up tube of the image-iconoscope type constructed according to this invention.

Fig. 2 is a section along the line II—II in Fig. 1, but omitting the potential supplies.

The image-iconoscope tube is constructed generally as described in our aforementioned co-pending application. The tube envelope is shown at 1 and the picture area of the target at 2. Scanning commences at the point A and one strip-like electrode 3 is arranged along the edge of the picture area corresponding to the end of line scanning and a second electrode 4 is arranged along the edge of the picture area corresponding to the end of frame scanning as described in the aforementioned specification.

A substantially semi-annular photo-cathode 5 is deposited on that part of the internal surface of the envelope 1 which extends from the target to the "waist" of the envelope and lies adjacent the side of the target corresponding to the commencement of scanning. The photo-cathode 5 thus extends only about half-way around the tube circumference as more clearly shown in Fig. 2. The photo-cathode 5 is illuminated by small electric lamps 6 located close to the outside of the tube envelope and on the side thereof diametrically opposite the photo-cathode 5.

Convenient sources of electric supply are provided for biassing the electrodes 3 and 4 positively with respect to the photo-cathode 5 and for energising the lamps 6.

The strip-like electrodes 3 and 4 are biassed positively with respect to the photo-cathode 5 whereby these strip-like electrodes serve the dual purpose of creating an electrostatic field across the picture area 2 tending to oppose the natural tendency of the secondary electrons released by the scanning beam to migrate mainly towards previously scanned areas of the target and also of accelerating the low velocity electrons released from the photo-cathode 5 towards the target, thereby producing redistribution of the secondary electrons and such distribution of the low velocity electrons over the picture area that "flare" is substantially eliminated.

The photo-cathode 5 is applied on to a grid 7 of low-resistance silver painted on the tube inside surface and connected to the wall anode 8 which constitutes the collector electrode. This grid prevents potential gradients from being built up across the surface of the photo-cathode due to the passing of the emission current through its high resistance. The lines of the grid may be 2 mm. wide and the mesh pitch about 10 mm.

It will be apparent that the invention has only been described by way of example and that various modifications may be made without in any way departing from its scope. For example, although for practical reasons of replacement, it is preferred to effect the illumination of the photo-cathode by separate lamps arranged outside the tube envelope, it will be clear that the lamps could, if desired, be mounted within the tube envelope at points opposite to the photo-cathode.

We claim:

1. Television pick-up tube apparatus incorporating a pick-up tube having a glass envelope, a target and at least two strip-like electrodes located along those edges of the picture area of said target which correspond respectively to the ends of line and frame scanning, a photo-cathode located adjacent the inside wall of and extending approximately half-way round the circumference of said envelope and in front of said target, means for biassing said electrodes positively with respect to said photo-cathode, and lamp means for illuminating said photo-cathode to produce a rain of low-velocity biassing electrons for flooding the entire picture area of the target, said lamp means being arranged close to that part of said tube envelope which lies diametrically opposite said photo-cathode.

2. Television pick-up tube apparatus incorporating a pick-up tube having a glass envelope, a target and at least two strip-like electrodes located along those edges of the picture area of said target which correspond respectively to the ends of line and frame scanning, a substantially semi-annular photo-cathode located adjacent the inside wall of said envelope and in front of said target and at the side thereof corresponding to the commencement of frame scanning, means for biassing said electrodes positively with respect to said photo-cathode, and lamp means for illuminating said photo-cathode to produce a rain of low-velocity biassing electrons for flooding the entire picture area of the target, said lamp means being arranged close to that part of said tube envelope which lies diametrically opposite said photo-cathode.

3. Television pick-up tube apparatus incorporating a pick-up tube having a glass envelope, a target and at least two strip-like electrodes located along those edges of the picture area of said target which correspond respectively to the ends of line and frame scanning, a large-area photo-cathode located adjacent the inside wall of said envelope and in front of said target and diagonally opposite the two edges thereof corresponding to the ends of line and frame scanning, means for biassing said electrodes positively with respect to said photo-cathode and lamp means for illuminating said photo-cathode to produce a rain of low-velocity biassing electrons for flooding the entire picture area of the target, said lamp means being arranged close to that part of said tube envelope which lies diametrically opposite said photo-cathode.

4. Television pick-up tube apparatus incorporating a pick-up tube having a glass envelope, a target and at least two strip-like electrodes located along those edges of the picture area of said target which correspond respectively to the ends of line and frame scanning, a large-area photo-cathode located adjacent the inside wall of said envelope and in front of said target, means for biassing said electrodes positively with respect to said photo-cathode, and lamp means for illuminating said photo-cathode to produce a rain of low-velocity electrons for flooding the entire picture area of the target, said photo-cathode being provided only at the part of the tube approximately diametrically opposite to that part of the target which corresponds to the end of the frame scan, and said lamp means being arranged outside the diametrically opposite wall of said tube envelope to illuminate said photo-cathode by light passing across the interior of the tube.

5. Television pick-up tube apparatus incorporating a pick-up tube having a glass envelope, a target and at least two strip-like electrodes located along those edges of the picture area of said target which correspond respectively to the ends of line and frame scanning, a substantially semi-annular photo-cathode located adjacent the inside wall of and extending approximately half-way round the circumference of said envelope and in front of said target, means for biassing said electrodes positively with respect to said photo-cathode, and lamp means for illuminating said photo-cathode to produce a rain of low-velocity electrons for flooding the entire picture area of the target, said photo-cathode being provided only at the part of the tube approximately diametrically opposite to that part of the target which corresponds to the end of the frame scan, and said lamp means being arranged outside the diametrically opposite wall of said tube envelope to illuminate said photo-cathode by light passing across the interior of the tube.

6. Television pick-up tube apparatus incorporating a pick-up tube having a glass envelope, a target and at least two strip-like electrodes located along those edges of the picture area of said target which correspond respectively to the ends of line and frame scanning, a grid of a good conductor located adjacent the inside wall of said envelope and in front of said target, a photo-cathode located upon said grid, means for biassing said electrodes positively with respect to said photo-cathode, and lamp means for illuminating said photo-cathode to produce a rain of low-velocity electrons for flooding the entire picture area of the target, said grid and photo-cathode being provided only at the part of the tube approximately diametrically opposite to that part of the target which corresponds to the end of the frame scan, and said lamp means being arranged outside the diametrically opposite wall of said tube envelope to illuminate said photo-cathode by light passing across the interior of the tube.

7. Television pick-up tube apparatus incorporating a pick-up tube having a glass envelope, a target, a wall anode and at least two strip-like electrodes located along those edges of the picture area of said target which correspond respectively to the ends of line and frame scanning, a grid of a good conductor located adjacent the inside wall of said envelope and in front of said target and continuous with said wall anode, a photo-cathode located upon said grid, means for biassing said electrodes positively with respect to said photo-cathode, and lamp means for illuminating said photo-cathode to produce a rain of low-velocity electrons for flooding the entire picture area of the target, said grid and photo-cathode being provided only at the part of the tube approximately diametrically opposite to that part of the target which corresponds to the end of the frame scan, and said lamp means being arranged outside the diametrically opposite wall of said tube envelope to illuminate said photo-cathode by light passing across the interior of the tube.

References Cited in the file of this patent

UNITED STATES PATENTS

| | | | |
|---|---|---|---|
| 2,131,892 | Iams | Oct. 4, | 1938 |
| 2,368,884 | Schade | Feb. 6, | 1945 |
| 2,622,226 | Theile | Dec. 16, | 1952 |
| 2,667,600 | Goff | Jan. 26, | 1954 |
| 2,683,832 | Edwards et al. | July 13, | 1954 |